United States Patent [19]

Delatorre

[11] Patent Number: 4,691,574

[45] Date of Patent: Sep. 8, 1987

[54] CAPACITANCE TRANSDUCER

[76] Inventor: Leroy C. Delatorre, 11 Crestwood, Sugar Land, Tex. 77478

[21] Appl. No.: 832,736

[22] Filed: Feb. 25, 1986

[51] Int. Cl.<sup>4</sup> .......................... G01L 7/08; G01L 9/12; G01L 19/04

[52] U.S. Cl. ..................................... 73/708; 73/724; 361/283

[58] Field of Search ........................ 73/708, 718, 724; 361/283

[56] References Cited

U.S. PATENT DOCUMENTS

| 4,091,683 | 5/1978 | Delatorre | 73/718 |
| 4,322,775 | 3/1982 | Delatorre | 361/283 |
| 4,434,451 | 2/1984 | Delatorre | 73/718 |
| 4,507,973 | 4/1985 | Barr et al. | 73/724 |
| 4,523,474 | 6/1985 | Browne et al. | 73/718 |

Primary Examiner—Donald O. Woodiel

[57] ABSTRACT

A capacitance transducer construction for borehole pressure measurements where the support for one of the capacitor plates sets is mounted in an independent structure which is attached through a temperature compensating means to the support for the other capacitor plates for eliminating stress effects. Electron bonding of materials having graduated coefficients of friction is utilized to minimize stress effects.

9 Claims, 5 Drawing Figures

PRIOR ART

CAPACITANCE TRANSDUCER

FIELD OF THE INVENTION

This invention relates to pressure measuring devices, and more particularly, to improvements in capacitance type pressure transducers for providing pressure measurements independent of temperature and independently of positional location of the transducer and which will retain operational stability over a period of time and use.

BACKGROUND OF THE PRESENT INVENTION

Capacitance type pressure transducers are commonly employed for pressure measurements. This type of pressure transducer operates on the principal of varying the electrical capacitance of a capacitor as a function of pressure and measuring the capacitance electrically to indicate the pressure. A capacitor typically consists of parallel electrically conductive plates which are spaced apart by a distance "D," a dielectric medium between the plates, and a certain plate area of conductivity. The electrical characteristics of the capacitor are defined by the following relationship:

$$C = 0.0884(K)(A/D)$$

Where "C" equals capacitance in coulombs, "K" equals the dielectric constant, "A" equals the area of the plates in square centimeters and "D" equals the spacing between the capacitor plates in centimeters.

In a pressure transducer application, one of the capacitor plates of a capacitor is attached to a flexible diaphragm and by moving or flexing the diaphragm relative to the other capacitor plate in response to pressure, the distance "D" is changed and this, in turn, produces an inverse effect upon the capacitance "C" which can be electrically measured. There are a number of factors which affect the accuracy of this type of measurement including: the change in the dielectric constant "K" by the introduction of a different atmosphere or medium between the capacitor plates; a change in the spring rate or "deflection characteristics" of the diaphragm because of a change in temperature; or construction of the elemental components of the pressure transducer with different materials. Where different types of materials are used in a transducer construction, temperature differentials or temperature changes produce an effect on the expansion of the different materials used in the mechanical construction in that the different materials have different expansion rates or coefficients of expansion. Thus, expansion of the different materials varies under the influence of a change in temperature. Capacitance type pressure transducers also are adversely affected by virtue of the distortion introduced by the non-linear response of the diaphragm surface with respect to the capacitance plates. Further, a drawback of most pressure transducers is that their relative positioning in space introduces gravitational forces which effect their response.

Heretofore, I have developed a ratiometric capacitance measuring system by which the desired capacitance measurement is made with respect to a reference capacitance measurement. Such a system eliminates variables such as the dielectric effect and additionally, provides a more accurate pressure measurement which is independent of instrumentation. Such a system is disclosed in my U.S. Pat. No. 4,091,683.

Heretofore, I also have developed a capacitor construction in which temperature compensation for materials is obtained by a temperature compensating system where the capacitance relationship is maintained independent of changes in the construction due to temperature. This system is disclosed in my U.S. Pat. No. 4,322,775.

The present invention is an improvement over my prior system in U.S. Pat. No. 4,322,775. I have found that in use of a system as disclosed in U.S. Pat. No. 4,22,775 the effect of repeated temperature changes through use in field operations causes the calibration of the sensor to change over time. In other words the positional spacing of the capacitor plate members in the construction changes as a consequence of temperature cycling. In analyzing this problem, I discovered a new construction for a temperature compensation system which eliminates changes in calibration due to temperature cycling, and in so doing, I have improved the accuracy of the pressure measurement markedly.

The present invention has for its objects the elimination of errors of measurement or drift in calibration due to temperature cycling of the measurement device, or due to a positioning effect on the mechanical construction in a capacitance type transducer over long periods of time and use, and to improve the accuracy of measurements.

To obtain these and other objects of the invention, the present invention includes a structure which has a number of design improvements which contribute to more accurate measurement systems.

DESCRIPTION OF THE PRESENT INVENTION

In the present system, reference and measuring capacitor plates are symetrically and co-extensively arranged relative to one another to respond identically with respect to changes in distance between the capacitor plates and with respect to a change of dielectric material. With fixed areas of the capacitor plates, the displacement distance "D" of the plates has an inverse relationship to the capacitance "C". In the construction of the present pressure transducer, the system is designed by choice of materials and their coefficients of thermal expansion so that, as the temperature may change and affect the spring rate of the sensor diaphragm, the capacitance is altered by changing the spacing "D" between the plates and maintains a calibrated relationship of the capacitances "C" to the spacing distances "D" as a constant which is independent of a change in temperature.

In the construction of the present invention, the upper and lower capacitor plates for the reference measuring capacitor are symetrical with respect to one another and mounted relative to one another by a center post construction. The center post construction includes an expansion element selected of metal which has a linear expansion in response to temperature which is selected relative to the linear expansion of the remaining materials in response to temperature. By calculating the sensitivity of the diaphragm in terms of the displacement of the pressure sensing element as a function of temperature to the displacement response of the center post construction as a function of temperature, the change in capacitance can be accurately correlated with spring rate as a function of temperature. That is, for a given change of temperature, the effect on the spring rate of the pressure diaphragm is compensated for by a change in capacitance so that the calibration of the measurement is constant. Mechanically, the expansion element in the center post construction is designed to expand relative to temperature so that it will produce change in the distance between the capacitor plates (and thus the capacitance) to maintain the original capacitance-distance relationship independently of the mounting for the capacitor plates.

To further eliminate the effects of temperature upon the pressure measurements made by the pressure transducer, the thermal impedance paths to each of the condensor plates are adjusted so as to provide for relatively equal displacements due to transient temperature distribution so that the transducer is uniformly effected by temperature rather than subject to differing temperature effects within the unit.

The mechanical construction of the unit is provided with mechanical structural isolation and inner connections so that capacitance plates are relatively insensitive to positioning changes.

The entire unit is enclosed within a protective vacuum atmosphere to thermally isolate the internal structure as well as providing a vacuum reference.

DESCRIPTION OF DRAWINGS

The foregoing invention as well as the objects of the invention will be best understood when taken in connection with the following drawings in which.

DESCRIPTION OF THE PRESENT INVENTION

Figure 1:
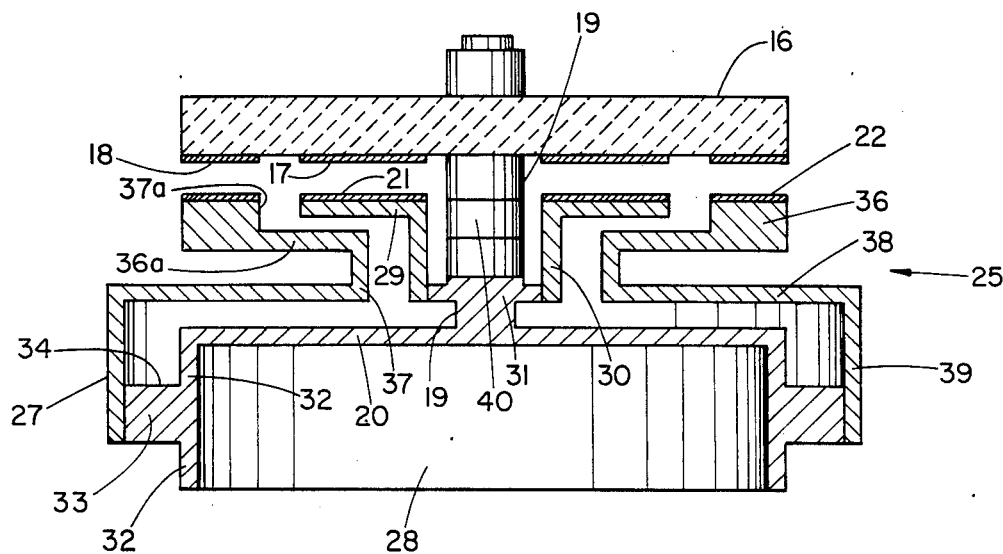
FIG. 1 is an illustration of a Prior Art transducer.

Referring now to FIG. 1, a capacitance type pressure transducer 25 is illustrated with a structural body member 27 which is concentrically arranged about a vertical central axis 28. In FIG. 1, an upper horizontal base plate 16 constructed of insulator material such as quartz and has concentric electrically conductive capacitance plate ring members 17, 18 and is mounted on a center post construction 19 which is attached to the center of a horizontal cylindrically shaped diaphragm 20.

A lower, electrically conductive plate ring member 21 is supported upon a horizontal annular flange 29 which couples to a vertical tubular section 30 the tubular section 30 couples to a lower radially extending, horizontal flange 31 which is a part of the center post construction 19. The diaphragm 20 at its outer edge couples to a vertical tubular section 32. The vertical tubular section 32 has an outwardly extending radial flange 33. The upper surface 34 of the radial flange 33 defines a horizontal plane of reference and from this plane there is a first heat path through the tubular section 32 above the flange 33, through the horizontal diaphragm 20, through the vertical post 19, through the horizontal flange 31, through the vertical tubular section 30, and through the horizontal flange 29 which supports the plate ring member 21.

A lower electrically conductive plate ring member 22 is supported on a horizontal flange 36 which has an internal recess 37a. The flange 36 couples to a horizontal flange 36a which couples to a vertical tubular section 37. The tubular section 37 couples to a horizontal diaphragm 38 which couples to an outer vertical tubular section 39 which couples to the radial flange 33. From the horizontal plane of reference 34 at the upper surface of the radial flange 33, there is a second heat path through the vertical tubular section 39, diaphragm 38, vertical section 37, horizontal flange 36a to the horizontal flange 36 which supports the plate member 22.

The first and second heat paths as described above are equalized with respect to expansion (as a function of temperature) by use of metals having the same characteristics. Further, the expansion matching of materials eliminates a steady state temperature response while the thermal impedance matching eliminates the transient temperature response. The impedance or resistance to the passage of heat is such that a change of temperature occurring with respect to the plane of reference 34 will affect the relative position of the plate members 21 and 22 equally with respect to expansion. Thus, inaccuracies due to temperature differentials on the elements can be minimized.

With respect to spacial position, the base plate 16, the center post construction 19 and the diaphragm 20 (together with the components thereon) have a first mass which has a bearing on the position of the plate member 21 and base plate 16 relative to the diaphragm 20. In other words, if the device is turned upside down, gravity has an effect on the flange 36, the section 37 and the diaphragm 38 (together with the components thereon) have a second mass which also has a bearing on the position of the plate member 22 relative to the diaphragm 38. By proportioning the relationship of mass and the diaphragms 20 and 38, the plate members 21 and 22 are equally affected by any positional changes of the transducer and thus, the relative accuracy of the capacitor spacing remains constant.

The center mounting post construction 19 is illustrated with a thermal compensator means 40. The relationship and function of the thermal compensator means 40 relative to the capacitance and diaphragm may be explained by reference to FIG. 2. For a base reference condition of pressure and temperature, the capacitor device as shown in FIG. 1 has the relationship of $$C = 0.0884(K)(A/D)$$

which can be redefined to (C) (D) = Constant

The capacitance "C" and distance "D" are thus inversely related to one another.

Figure 2:
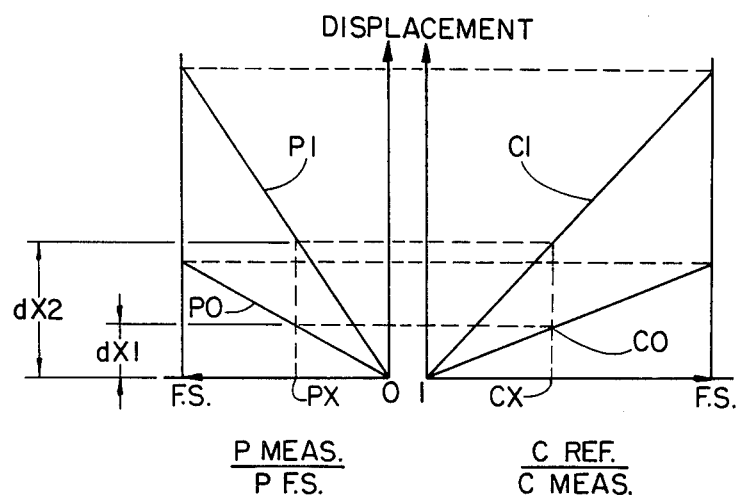
FIG. 2 is a schematic illustrations of certain aspects of the invention.

In FIG. 2, the slope line $C_o$ represents the relationship of a capacitance ratio on a horizontal scale to displacement of the diaphragm 20 on a vertical scale for a constant temperature $t_0$. The capacitance ratio is the reference capacitance value divided by the measured capacitance value the slope line $C_o$ represents a plot from a static base condition to a unit value of the full scale deflection of the diaphragm.

For the same temperature $t_0$, there is a pressure relationship on a horizontal scale which is corelatable to displacement of the diaphragm on a vertical scale for the constant temperature $t_0$. The pressure ratio is the measured pressure value divided by the full scale pressure value required to obtain full scale deflection of the diaphragm. The pressure displacement relationship is based upon the spring rate of flexibility of the diaphragm and is defined by the slope line $P_o$. Thus, for a given spring rate of a diaphragm at a temperature $t_0$, a given pressure/displacement relationship $P_o$ exists, and a defined capacitance/displacement $C_o$ relationship exists.

If the temperature is increased from $t_0$ to a higher temperature $t_1$, then the spring rate of the diaphragm changes and a slope line relationship is illustrated by $P_1$ exists. The compensator means 40 serves the function of changing the distance (and hence the capacitance) between the capacitor plate members 17 and 21. The compensator means 40 serves to change the distance between the capacitor plate members so that the defined capacitance/displacement relationship $C_1$ is altered to compensate for the change in spring rate because of the increase in temperature.

As an example, for a pressure value of $P_x$ and temperature $t_0$, there is a physical diaphragm displacement of $d_{x1}$ and a $t_0$ capacitance value of $C_x$. For the same pressure value of $P_x$ and an increased temperature to $t_1$, the diaphragm displacement is $d_{x2}$ but the compensator means 40 changes the spacing between the capacitor plate members 17 and 21 so that the diaphragm displacement is $d_{x2}$ and so that the capacitance ratio value remains at $C_x$.

Figure 3:
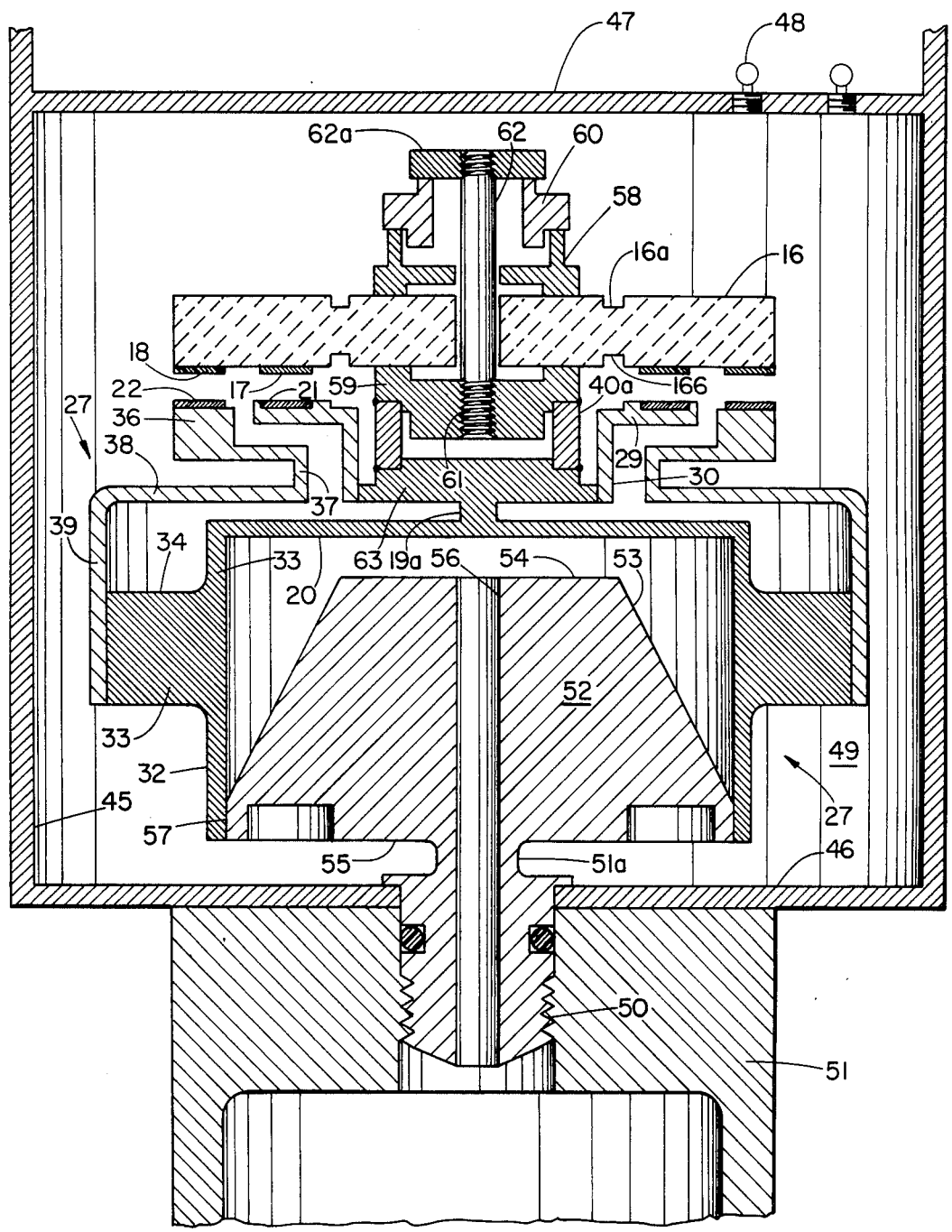
FIG. 3 is a schematic illustration of the present invention.

A more detailed embodiment for the foregoing system is illustrated in FIG. 3. Similar numbers are used for corresponding elements which have previously been described. In FIG. 3, the body member 27 is enclosed within a tubular housing member 45 which has a lower transverse and horizontal closure wall 46 and an upper transverse and horizontal closure wall 47. The upper closure wall 47 has electrical terminal connections 48 through the wall which are not shown as connected to the conductor plates to simplify the illustration in the drawing.

Electronics for the system are contained in the housing member 45 above the horizontal wall 47. The interior 49 of the housing enclosure is maintained at a vacuum atmosphere. The body member 27 has an exterior, threaded connector 50 which is threadedly and sealingly received in a pressure line connection 51 in which the pressure is intended to be measured.

Above the threaded connector 50, is a necked down post section 51a of reduced diameter. The reduced diameter post section 51a serves to impede heat transfer and to isolate stresses from the structure supported by section 51a. The section 51a connects to a cylindrical shaped base member 52. The base member 52 has an outer tapered surface 53 between upper and lower horizontal face surfaces 54, 55. A pressure bore 56 extends through the base member 52 to provide fluid access to the horizontal sensor diaphragm 20.

The horizontal sensor diaphragm 20 is the upper horizontal wall of a cup-shaped member which has a vertical tubular wall section 32 which is suitably attached and sealed to a lower base section 57 to contain the measured pressure. As illustrated, a relatively short length of the base section 57 of the base member 52 contacts the vertical wall section 32 so that the heat transfer is restricted to this coupling. Midway of the length of the vertical wall section 32 is an outwardly extending radial flange 33 which serves as a support for the measuring plate member 22 as well as a temperature isolation reference point.

An inner reference capacitor ring plate ring member 17 and an outer measuring capacitor ring plate member 18 are supported on lower surface of a quartz disc plate 16. The quartz disc plate 16 has upper and lower annular grooves 16a and 16b which extend partially into the body of the disc plate 16. The grooves 16a and 16b function to eliminate transfer of distortion caused by the upper and lower central mounting discs 58 and 59 from affecting the capacitor ring plate members 17 and 18. The upper and lower central mounting discs 58 and 59 are constructed of "invar" material which has a low coefficient of expansion. The upper mounting disc 58 has a lower ring section with an end surface which engages the upper surface of the disc plate 16. The upper mounting disc 58 also has an upper ring section with an end surface which engages the lower surface of a clamping disc 60.

The lower mounting disc 59 has an upper ring section with an end surface which engages the lower surface of the quartz disc plate 16. The lower mounting disc 59 has a threaded bore 61 which receives a threaded member 62, the threaded member 62 passing through the clamping disc 60 and the upper mounting disc 58. When the threaded member 62 is inserted and threadedly attached to the lower mounting disc 59, the clamping disc 60 is deflected under compression by a nut member 62a and provides a spring force which prevents unthreading of the threaded member 62 from the lower mounting disc 59 due to expansion and contraction under the effects of temperature. Thus, one significant construction detail is the clamping under spring force, of the mounting discs 58 and 59 to the quartz disc plate 16 and isolating the support for the disc plate 16 from the temperature compensation means 40. Alternatively to a threaded attachment, the threaded member 62 may be electron bonded to the disc 59.

A ring shaped temperature compensation element 40a is disposed between the lower mounting disc 59 and a cylindrical support element 63 on a post 19a on the diaphragm 20. The outer surface of the support element 63 is attached to the lower end of the vertical tubular section 30 which extends upwardly to an outwardly extending horizontal flange 29. On the upper surface of the flange 29 is the electrode plate member 21. As illustrated, plate members 17 and 21 are directly opposite to one another and are supported on the same post member 19a and have thermal compensator means directly connected to each of the supports for the plate members 17 and 21.

The outer capacitor plate member 22 is mounted on a structure which includes a tubular section 39 coupled to the flange 33, a horizontal diaphragm 38 or wall forming a mechanical diaphragm, a vertical tubular section 37 and an outwardly extending flange 36 on which the plate member 22 is formed. The arrangement is such that the plate members 18 and 22 are parallel and opposite to one another.

The foregoing structure achieves the stated objectives in operation. The diaphragms 38 and 20 and balancing of the masses which respectively affect the diaphragm permit the measurements to be made independent of the spacial position of the device. That is, if plate member 18 moves downward because of gravity, the plate member 22 moves downward an equal distance. In short, plate members 18 and 22 are physically affected equally by spacial position so that their distance relationship stays constant.

Heat distribution is handled by the vacuum atmosphere which effectively limits the heat input path to the center mounting for the overall structure. For applied heat changes, the time required for transfer for thermal energy from the plane 34 to the respective plate members 21 and 22 is equal so that there is an equal thermal effect on the plates. It will be appreciated that the effective thermal length between the surface 34 and plate members 21 and 22 can be controlled by adjusting the relative thickness of the walls of the tubular section 32 and 39 with respect to the remaining mass of the thermal path. The thermal length of the path is essentially equal to equal thermal transient expansion displacement relative to the plate members 21 and 22.

The structure, as noted before, maintains the condenser plate surfaces parallel to one another because the reference capacitor plate members 17 and 21 move together and the outer plate members 18 and 22 are mounted on independent references.

The temperature compensation is based upon a change in the physical spacing between the upper and lower sets of capacitor plate members in relation to the change of spring rate of the sensor diaphragm 20 as a function of temperature. Stated functionally, as the temperature increases with respect to a base temperature, the diaphragm 20 will become more resilient. This, in turn, means that for a given pressure measurement, the capacitor plate members 18 and 22 should be moved a greater distance apart. At the same time, however, the increase in temperature causes the capacitor plate members 18 and 22 to move away from to one another because of expansion of the supporting metals. All of the metals of the body member 27 are the same material to make the coefficient of expansion identical. The thermal compensator means 40a is constructed of a different material having a similar characteristic of thermal expansion (such as stainless steel) so that the relative expansion of compensator means 40a relative to the other metal of the body member 27 is linear in response to a temperature change. By adjusting the physical parameters, the compensator means 40a changes the spacing between the reference capacitor plate members 17 and 21 and between the plate members 18 and 22 so that even though the increased temperature permits the diaphragm to move the plate members through a greater distance of separation, the compensator means 40a increases the spacing between the plate members by an appropriate distance so that the base relationship between the capacitance and the distance between capacitor plates is maintained substantially constant.

Figure 4:
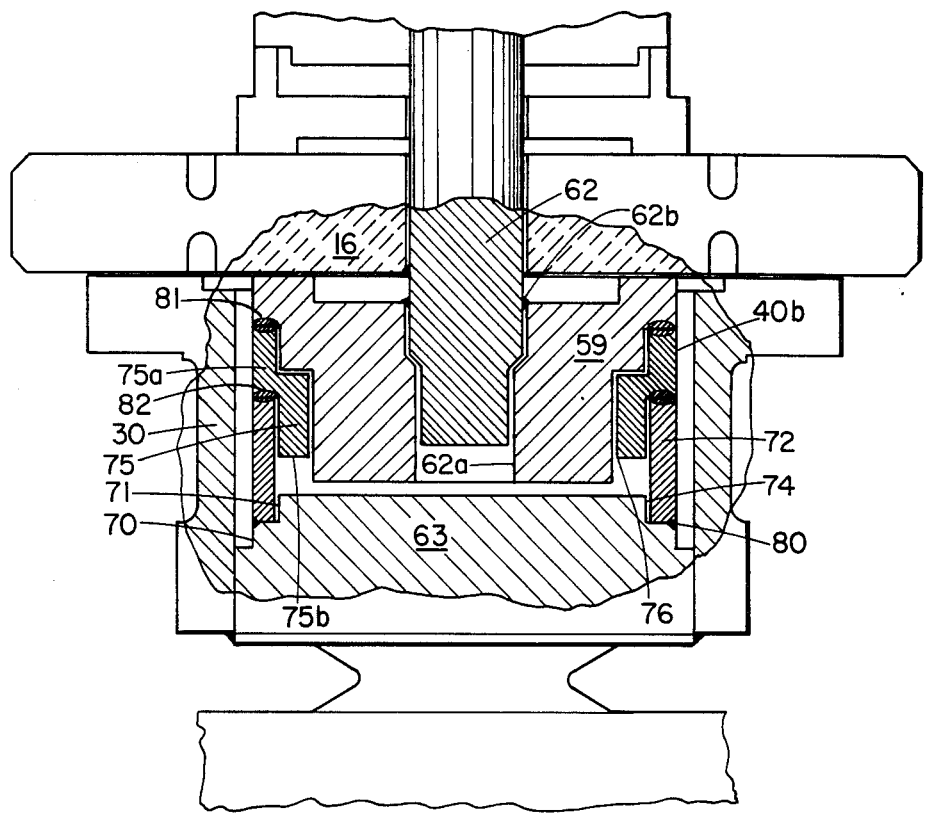
FIG. 4 is an enlarged section of a part of the present invention.

Referring now to FIG. 4, an alternative structural relationship for the temperature compensative means is illustrated in a partial detail of a transducer. In FIG. 4, (where like numbers are used for similar parts) a base member 63 has a lower outer circumferential section which has smaller diameter sections 70 and 71. An annular ring member 72 is attached to the base member 63 and has an inner diameter section which provides a gap 74 between the ring member 72 and the diameter section 71. The outer surface of the ring member 72 corresponds to the outer diameter of the diameter section 70. On the upper end of the ring member 72 is another ring member 75 which has an upper ring section 75a and lower inwardly offset ring section 75b. The lower inwardly offset ring section 75b is spaced inwardly of the inner surface of the ring member 59 to provide an annular gap 76. The upper end of the ring section 75a is attached to the lower support base member 59. A rod member 62 which extends upwardly through the disc member 16 is received in a bore 62a and electron bonded in place at 62b.

In FIG. 3, the lower disc 59 is constructed from invar which has a coefficient of expansion of 6.7 ppm/° F. The spacer 40a is constructed of stainless steel 18-8 (18% chromium and 8% nickel) which has coefficient of expansion of 9.6 ppm/° F. The base member 63 is invar.

In FIG. 4, the base number 59 is invar which is 36% nickel and 64% iron, the ring member 75 is an alloy of 52% nickel and 48% iron which has a coefficient of expansion of 5.6 ppm/° F. and the spacer 72 is stainless steel with an coefficient of expansion of 9.6 ppm/° F.

When the attachment of parts 63, 72, 75 and 59 is made, it is accomplished by electron bonding. The electron bonding process produces a fusion of metal. For example, between the base member 59 and spacer 75 in FIG. 4, the electron bonding produces a fused area 81 between the parts which is approximately 44% nickel and 56% iron.

The fusion area 82 between the parts 75 and 72 is approximately 30% nickel. The effect of the interposition of the spacer 75 is to introduce a material with a nickel content greater than invar so that upon fusion the fused area will provide an intermediate value between the parts and thereby reduce the stress forces in the parts due to expansion.

Figure 5:
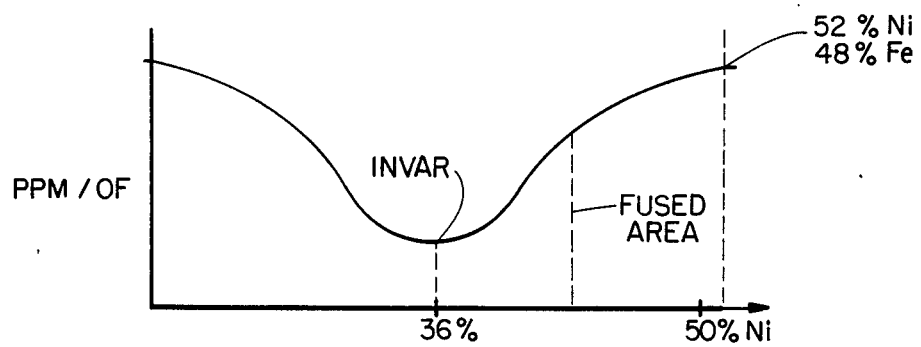
FIG. 5 is a graph of relationships pertinent to the present invention.

As shown in FIG. 5, the coefficient of expansion is a function of nickel content so that the fusion area has a nickel content between the nickel content of the two adjoining parts and therefore has an intermediate coefficient of expansion.

It will be apparent to those skilled in the art that various changes may be made in the invention without departing from the spirit and scope thereof and therefore the invention is not limited by that which is enclosed in the drawings and specifications, but only as indicated in the appended claims.

I claim:

1. A capacitance type pressure transducer for converting fluid pressure into electrical signals representative of a magnitude of pressure, comprising:

housing means having a pressure measuring chamber with an input orifice for receiving a pressure input to be measured and with a flexible diaphragm for displacement with respect to a first axis as a function of pressure where said first axis is transverse with respect to said diaphragm;

first inner and outer support means in said housing means for respectively supporting first inner and first outer annular electrode plate means on said housing means and on said diaphragm where said plate means are in a first plane transverse to said first axis, said inner support means including a central cylindrical support member;

second support means in said housing means including an annular disc having upper and lower surfaces, and said disc having centrally located upper and lower bearing surfaces;

second inner and outer annular electrode plate means on said lower surface in a second plane transverse to said first axis and in a facing and spaced relationship to said first inner and first outer annular electrode plate means; and interconnecting means for interconnecting said first inner support means and said second support means to one another including an annular temperature compensating ring means attached to said central cylindrical member, a lower support ring attached to said ring means and bearing on a lower bearing surface of said second support means, an upper annular support ring bearing on an upper bearing surface of said second support means, and rod member means extendable through openings in said upper annular support ring, said annular disc for interconnecting said upper annular support ring and said annular disc to said lower support ring.

2. The apparatus as set forth in claim 1 wherein said rod member means is electron bonded to said lower support ring and is threaded at its opposite end for receiving a nut member.

3. The apparatus as set forth in claim 1 wherein said rod member means is threadedly connected to said lower support ring.

4. The apparatus as set forth in claim 3 wherein said interconnecting means includes an annular clamping disc which is arranged to deflect under compression, said clasping disc being disposed above said upper annular support ring.

5. The apparatus as set forth in claim 3 wherein said interconnecting means includes an annular clamping disc which is arranged to deflect under compression, said clamping disc being disposed above said upper annular support ring.

6. A capacitance type pressure transducer for converting fluid pressure into electrical signals representative of a magnitude of pressure, comprising:
 housing means having a pressure measuring chamber with an input orifice for receiving a pressure input to be measured and with a flexible diaphragm for displacement with respect to a first axis as a function of pressure where said first axis is tranverse with respect to said diaphragm;
 first inner and outer support means in said housing means for respectively supporting first inner and first outer annular electrode plate means on said housing means and on said diaphragm where said plane means are in a first plane transverse to said first axis, said inner support means including a central cylindrical support member;
 second support means in said housing means including an annular disc having upper and lower surfaces, and said disc having centrally located upper and lower bearing surfaces;
 second inner and outer annular electrode plate means on said lower surface in a second plane transverse to said first axis and in a facing and spaced relationship to said first inner and first outer annular electrode plate means; and
 interconnecting means for interconnecting said first inner support means and said second support means to one another including an annular temperature compensating ring means attached by electron bonding to said central cylindrical member, an intermediate ring member attached by electron bonding to said compensating ring means, a lower support ring attached to said intermediate ring member and bearing on a lower bearing surface of said second support means, an upper annular support ring bearing on an upper bearing surface of said second support means, and rod member means extendable through openings in said upper annular support ring, said annular disc for interconnecting said upper annular support ring and said annular disc to said lower support ring, said intermediate ring member having a nickel content intermediate of the nickel content in said compensating ring means and said lower support ring.

7. The apparatus as set forth in claim 6 wherein said intermediate ring member has a material content of 52% nickel and 48% iron and said lower supporting ring has a material content of 36% nickel and 64% iron.

8. The apparatus as set forth in claim 6 wherein said compensating ring means is stainless steel 18-8.

9. A capacitance type pressure transducer for converting fluid pressure into electrical signals representative of a magnitude of pressure, comprising:
 housing means having a pressure measuring chamber with an input orifice for receiving a pressure input to be measured and with a flexible diaphragm for displacement with respect to a first axis as a function of pressure where said first axis is transverse with respect to said diaphragm;
 first inner and first outer support means in said housing means for respectively supporting first inner and outer annular electrode plate means on said housing means and on said diaphragm where said plate means are in a first plane transverse to said first axis, said inner support means including a central cylindrical support member;
 second support means in said housing means including an annular disc having upper and lower surfaces, and said disc having centrally located upper and lower bearing surfaces;
 second inner and outer annular electrode plate means on said lower surface in a second plane transverse to said first axis and in a facing and spaced relationship to said first inner and first outer annular electrode plate means;
 interconnecting means for interconnecting said first inner support means and said second support means to one another including an annular temperature compensating ring means attached by electron bonding to said central cylindrical member, intermediate ring member attached by electron bonding to said compensating ring means, a lower support ring attached to said intermediate ring member and bearing on a lower bearing surface of said second support means, an upper annular support ring bearing on an upper bearing surface of said second support means, and rod member means extendable through openings in said upper annular support ring, said annular disc for interconnecting said upper annular support ring and said annular disc to said lower support ring, said intermediate ring member having a coeficient of expansion intermediate of the coefficient of expanses for said compensating ring means and said lower support ring.

* * * * *